US012737261B2

(12) United States Patent
Mitsuma et al.

(10) Patent No.: US 12,737,261 B2
(45) Date of Patent: Sep. 15, 2026

(54) DEFINED DATA BACKUP

(71) Applicant: International Business Machines Corporation, Armonk, NY (US)

(72) Inventors: Shinsuke Mitsuma, Machida (JP); Atsushi Abe, Ebina (JP); Hiroshi Itagaki, Yokohama (JP); Tohru Hasegawa, Tokyo (JP); Tsuyoshi Miyamura, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 18/924,164

(22) Filed: Oct. 23, 2024

(65) Prior Publication Data

US 2026/0111316 A1 Apr. 23, 2026

(51) Int. Cl.
*G06F 11/1446* (2026.01)

(52) U.S. Cl.
CPC ...... *G06F 11/1451* (2013.01); *G06F 11/1461* (2013.01)

(58) Field of Classification Search
CPC ......................... G06F 11/1451; G06F 11/1461
USPC ........................................................ 714/6.3
See application file for complete search history.

(56) References Cited

U.S. PATENT DOCUMENTS 8,694,469 B2 4/2014 Parab
8,938,595 B2 1/2015 Sandorfi et al.
10,078,555 B1 9/2018 Kumar et al.
10,203,905 B2 2/2019 Neporada et al.
11,579,985 B2 2/2023 Beloussov et al.
11,775,396 B1 * 10/2023 Bharadwaj .......... G06F 11/1453 714/4.11
2003/0126247 A1 * 7/2003 Strasser .............. G06F 11/1458 707/999.2
2022/0083426 A1 3/2022 Chopra et al.

OTHER PUBLICATIONS

How Infinite Incremental Backups Work, Retrieved from: https://support.arcserve.com/s/article/201914869?language=en_US, Oct. 26, 2021, 3 Pages.

* cited by examiner

*Primary Examiner* — Yair Leibovich
(74) *Attorney, Agent, or Firm* — Amin, Turocy & Watson, LLP

(57) ABSTRACT

Defined backup using a computerized tool is enabled. For example, a system can comprise a processor that executes computer executable components stored in a computer-readable memory. The computer executable components can include a fragment component that segments data that has not changed since a previous backup of a data storage device into a defined quantity of a plurality of fragments and a backup component that performs one or more defined backups on the data storage device. In various embodiments, the one or more defined backups can comprise one of the plurality of fragments of the data that has not changed since the previous backup of the data storage device and incremental data. The incremental data may include data that has changed since the previous backup of the data storage device.

16 Claims, 7 Drawing Sheets

300

UNCHANGED DATA 302

FRAGMENT COMPONENT 202

UNCHANGED DATA FRAGMENT 304

UNCHANGED DATA FRAGMENT 306

UNCHANGED DATA FRAGMENT 308

UNCHANGED DATA FRAGMENT 310

UNCHANGED DATA FRAGMENT 312

UNCHANGED DATA FRAGMENT 304

CHANGED DATA 314

BACKUP COMPONENT 204

UNCHANGED DATA FRAGMENT 304

CHANGED DATA 314

DEFINED INCREMENT 316

DEFINED DATA BACKUP

BACKGROUND

Data backup involves copying and storing data from one data storage location to another, for instance, to protect against data loss or data corruption. Such data can be transferred to and from one or more of a variety of locations relative to a data source, such as physically attached media including hard drives, solid state drives, or floppy disks, or network attached storage including cloud storage. The routine, systematic backup of data to these locations facilitates data redundancy which can be leveraged to mitigate against hardware failure, cyberattacks, accidental deletions, or natural disasters, among other events. However, existing backup processes are slow and require excessive storage space.

SUMMARY

The following presents a summary to provide a basic understanding of one or more embodiments of the present disclosure. This summary is not intended to identify key or critical elements or delineate any scope of the particular embodiments or any scope of the claims. Its sole purpose is to present concepts in a simplified form as a prelude to the more detailed description that is presented later.

According to an embodiment, a system can include a processor that executes computer executable components stored in a computer-readable memory (e.g., non-transitory computer-readable memory), in which the computer executable components include a fragment component that segments, into a defined quantity of a plurality of fragments, data that has not changed since a previous backup of a data storage device, and a backup component that performs one or more defined backups on the data storage device, the one or more defined backups including one of the plurality of fragments of the data that has not changed since the previous backup of the data storage device, and incremental data, where the incremental data includes data that has changed since the previous backup of the data storage device.

In another embodiment, a machine-readable medium (e.g., non-transitory machine-readable medium) can include executable instructions that, when executed by at least one processor, facilitate performance of operations, including segmenting data that has not changed since a previous backup of a data storage device into a defined quantity of a plurality of fragments, and performing one or more defined backups on the data storage device, the one or more defined backups including one of the plurality of fragments of the data that has not changed since the previous backup of the data storage device, and incremental data, where the incremental data includes data that has changed since the previous backup of the data storage device.

In yet another embodiment, a method can include segmenting, by a system operatively coupled to a processor data that has not changed since a previous backup of a data storage device into a defined quantity of a plurality of fragments, and performing, by the system, one or more defined backups on the data storage device, the one or more defined backups including one of the plurality of fragments of the data that has not changed since the previous backup of the data storage device, and incremental data, where the incremental data includes data that has changed since the previous backup of the data storage device.

DETAILED DESCRIPTION

Figure 1:
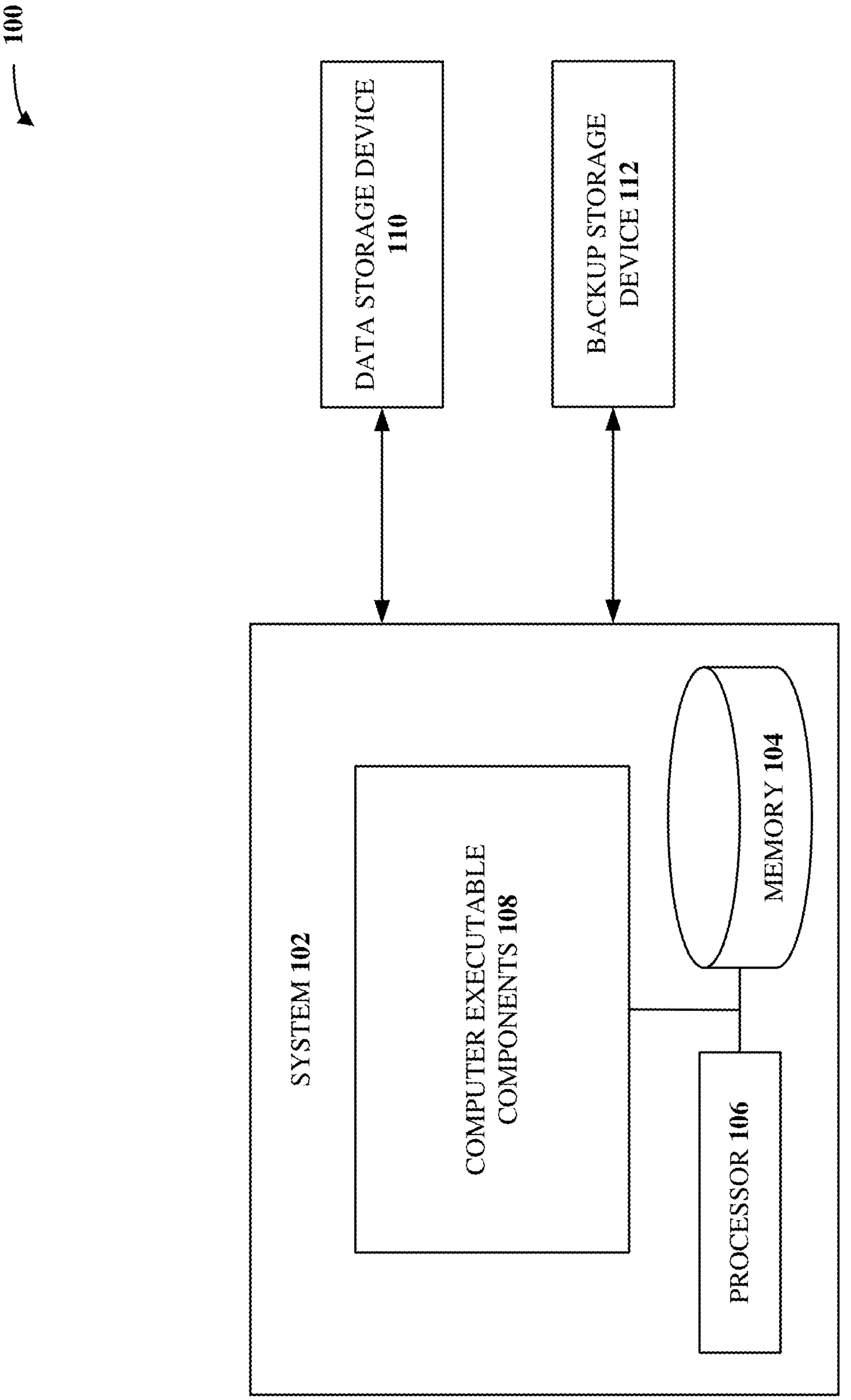
FIG. 1 is an example system that facilitates a defined backup in accordance with one or more embodiments described herein.

The following detailed description is merely illustrative and is not intended to limit embodiments or applications or uses of embodiments. Furthermore, there is no intention to be bound by any expressed or implied embodiments presented in the preceding Background or Summary sections or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. One or more embodiments can be practiced without these specific details.

It is noted that a backup herein is generally defined as a copy of data (e.g., files or information) stored on a separate device or location to protect against data loss due to accidents, system failures, or security breaches.

Four existing types of continuous backups are currently utilized: full backup, differential backup, incremental backup, and forever incremental backup.

In a full backup, all the data of a data storage device is backed up each time a backup occurs. Consequently, full backups require significant data transfer time and data storage space.

In a differential backup, data that has been updated since the last full backup is backed up. When a set number of differential backups is exceeded, a new full backup is performed, and thereafter the differential between the new full backup and the current data ready for backup is backed up. Therefore, differential backups also require frequent full backups and thus also require significant data transfer time and data storage space.

In an incremental backup, data that has been updated since the previous backup is backed up. When a set number of incremental backups is exceeded, a new full backup is performed, and thereafter, incremental backups are performed from the new full backup. Therefore, incremental backups also require frequent full backups and thus also require significant data transfer time and data storage space.

In a forever incremental backup, the need for periodic full backups is eliminated which saves data transfer time and data storage space as compared to full, differential, and incremental backups. When the set number of incremental backups is exceeded, the previous full backup and subsequent incremental backups are combined (e.g., merged) and used as a new full backup.

For all backup types other than incremental forever backups, a full backup must be performed periodically. Full backups take longer than differential or incremental backups, so if it is difficult to regularly allocate a sufficient time frame for backups, forever incremental backups can be an improved option as compared to full, differential, or incremental backups. However, forever incremental backups are only employable if the backup target and destination are block devices that meet certain hardware or software requirements such as the ability to merge multiple backups into a single backup. In this regard, forever incremental backups cannot be applied to tape-type backup destinations (e.g., tape-type data storage devices).

Accordingly, existing techniques can be considered as suffering from various technical problems.

Various embodiments described herein can ameliorate or address one or more of these technical problems. In this regard, the subject application enables a backup process that is applicable to a greater number of backup targets and storage destinations and does not require regular full backups. Various embodiments described herein can include systems, computer-implemented methods, apparatus, or computer program products that can facilitate defined backups herein. For instance, in various embodiments of a defined backup of the present disclosure, in addition to data that has changed since the previous backup, a portion of data that has not been updated is also backed up so that all data required for restoration is present somewhere in the most recent set number of backups.

Various embodiments described herein can be considered as a computerized tool (e.g., any suitable combination of computer executable hardware or computer executable software) that can facilitate a defined backup. In various aspects, such a computerized tool can include a fragment component, a backup component, a data overwrite component, and/or a recovery component.

Various embodiments described herein can be employed to use hardware or software to solve problems that are highly technical in nature (e.g., to facilitate a defined backup), that are not abstract, and that cannot be performed as a set of mental acts by a human. Further, some of the processes performed can be performed by a specialized computer for carrying out defined acts related to a defined backup herein.

For example, such defined acts can include a system including a processor segmenting data that has not changed since a previous backup of a data storage device into a defined quantity of a plurality of fragments and performing one or more defined backups on the data storage device. The one or more defined backups may include one of the plurality of fragments of the data that has not changed since the previous backup of the data storage device and incremental data; the incremental data can include data that has changed since the previous backup of the data storage device.

In various embodiments, the one or more defined backups can include two or more defined backups. The greater the quantity defined backups utilized in a chain or set of defined backups, the smaller each defined backup can be, thus reducing data transfer times during each backup. In this regard, the two or more defined backups can be iteratively performed a number of times equal to the defined quantity of the plurality of fragments.

In various embodiments, such defined acts can further include determining the defined quantity of the plurality of fragments according to a defined fragmenting process based on a total size of the data or a type of the data storage device. In various embodiments, one of the plurality of fragments can be determined based on a calculation of one divided by the defined quantity of the plurality of fragments less a quantity of the one or more defined backups plus two from an initial backup. The calculation may exclude changed data from between a second defined backup and a current defined backup as well as unchanged data from between the second defined backup and the current defined backup less one. This may be in response to a determination that the quantity of defined backups is less than or equal to the defined quantity of the plurality of fragments plus one.

In further embodiments, the one of the plurality of fragments can be determined based on a calculation of a combination of changed data defined by a quantity of defined backups less the defined quantity of the plurality of fragments and unchanged data defined by a quantity of defined backups less the defined quantity of the plurality of fragments. The calculation may exclude changed data from between a current defined backup and a defined backup defined by the current defined backup less the defined quantity of the plurality of fragments plus one. This may be in response to a determination that the quantity of defined backups is greater than the defined quantity of the plurality of fragments plus one.

In various embodiments, elements of the one or more defined backups can include identifiers associated with respective data of the data storage device. In this regard, the defined acts can further include, in response to a determination that data represented by an identifier of the identifiers is overwritten, updating contents of corresponding data without changing elements of a corresponding set of one or more defined backups.

In various embodiments, the performing of the one or more defined backups on the data storage device results in a dataset. In this regard, elements of the dataset can include identifiers associated with respective data of the data storage device. Further, the data storage device can include a file system, and an identifier of the identifiers can include a path name of a respective file of the file system. Additionally, or alternatively, the data storage device can include a block storage device, and an identifier of the identifiers can include a respective block number.

In various embodiments, such defined acts can further include, in response to a defined restoration condition being determined to be satisfied, performing a recovery of the data storage device. In this regard, the recovery of the data storage device can be based on a determination of the defined quantity of the plurality of fragments.

Such defined acts described above are inherently computerized. Indeed, embodiments herein are inherently computerized and include specific software-oriented architectures. Embodiments herein cannot be executed by the human mind, or by humans with mere pen and paper, in any reasonable or practicable way without computers. In fact, the technical field of data backup (e.g., via a defined backup as discussed herein) is directed toward enabling a processor-enabled device to backup both data that has changed since the previous backup and a portion of data that has not been updated during an incremental backup. This way, all data required for restoration is present somewhere in the most recent set number of backups. The foregoing is applicable to an increased quantity of backup target types and storage destination types as compared to existing backup methods or processes. In this regard, it would make no sense whatsoever to discuss any aspect of the field of data backup of a computing context or otherwise without reference to computing devices.

Moreover, various embodiments described herein can integrate into a practical application various teachings relating to defined backups. As described above, for all existing backup types other than incremental forever backups, a full backup must be performed periodically. Forever incremental backups, however, can only be utilized if the backup target and destination are block devices that meet certain requirements such as the ability to merge multiple backups into a single backup. In this regard, forever incremental backups cannot be applied to tape destinations (e.g., tape-type data storage devices) because tape storage is sequential in which data is written and read in a continuous stream on a tape. Thus, the merging required by forever incremental backups cannot occur. Various embodiments described herein can ameliorate such technical problems by, during a backup increment, backing up both data that has changed since the previous backup and a portion of data that has not been updated is also backed up so that all data required for restoration is present somewhere in the most recent set number of backups (e.g., a defined quantity of recent backups resulting in a set of recent backups).

Furthermore, various embodiments described herein can control real-world tangible devices based on the disclosed teachings. For example, various embodiments described herein can write real-world data on real-world data storage devices and/or can render outputs on real-world computer screens or monitors.

It is noted that the figures and description provide non-limiting examples of various embodiments and are not necessarily drawn to scale.

FIG. 1 is a block diagram 100 that includes an example system 102 that can facilitate defined backups in accordance with one or more embodiments described herein. As shown, the system 102 can be communicatively coupled and/or electronically integrated, via any suitable wired or wireless electronic connection(s), with a data storage device 110 and/or backup storage device 112.

Figure 2:
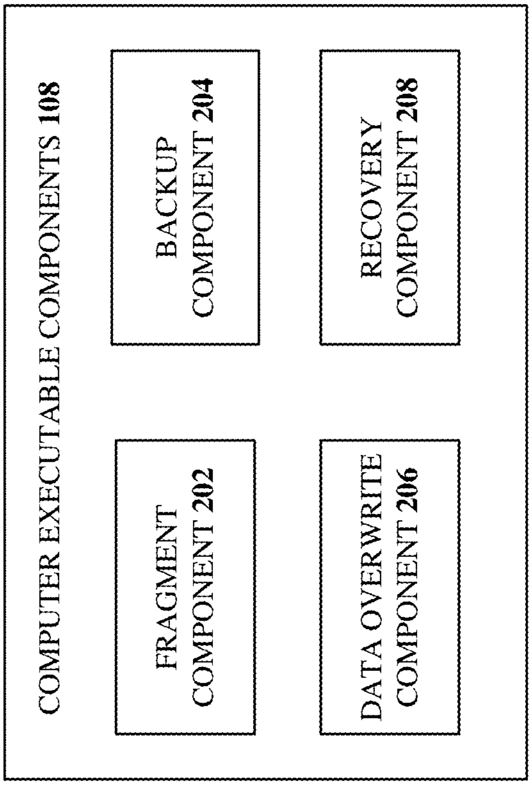
FIG. 2 depicts example computer executable components in accordance with one or more example embodiments described herein.

In various embodiments, the system 102 can include a processor 106 (e.g., computer processing unit or microprocessor) and a computer-readable memory 104 (e.g., non-transitory computer-readable memory) that is operably or operatively or communicatively connected or coupled to the processor 106. The computer-readable memory 104 can store computer executable instructions which, upon execution by the processor 106, can cause the processor 106 or other components of the system 102 (e.g., computer executable components 108) to perform one or more acts. In various embodiments, the computer-readable memory 104 can store computer executable components 108. FIG. 2 depicts example computer executable components 108 in accordance with the present disclosure. The computer executable components 108 include a fragment component 202, a backup component 204, a data overwrite component 206, and/or a recovery component 208. The processor 106 can execute the computer executable components 108. In various instances, the fragment component 202, backup component 204, data overwrite component 206, and/or recovery component 208 can collectively be considered as one or more computer executable components 108 of the system 102.

In various aspects, it should be appreciated that the one or more computer executable components 108 are described primarily herein as including four components (e.g., the fragment component 202, backup component 204, data overwrite component 206, and/or recovery component 208 as shown in FIG. 2) for ease of explanation and illustration. However, the one or more computer executable components 108 are not limited to being implemented as exactly such four components in every embodiment. Indeed, in some embodiments, the functionalities described herein of such four components can be combined in any suitable fashion so as to be implemented in or by fewer than four components (e.g., in some cases, a single component can perform all of the functionalities that are described herein with respect to the computer executable components 108). In other embodiments, the functionalities described herein of such four components can instead be distributed, separated, split, or divided in any suitable fashion so as to be implemented in or by more than four components (e.g., two or more components can facilitate the functionalities that are performable by the fragment component 202, two or more components can facilitate the functionalities that are performable by the backup component 204, two or more components can facilitate the functionalities that are performable by the data overwrite component 206, two or more components can facilitate the functionalities that are performable by the recovery component 208, and so on).

Figure 3:
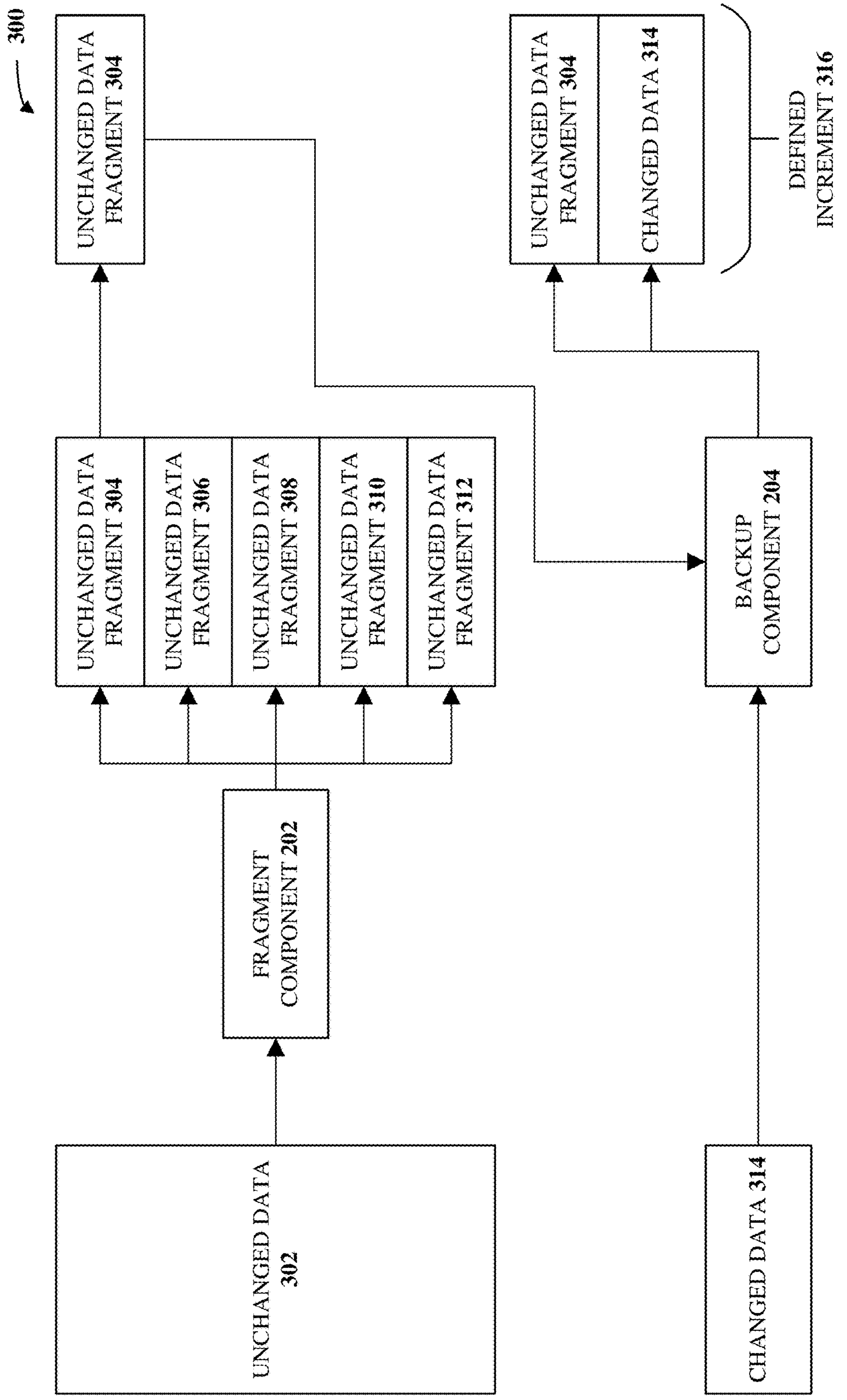
FIG. 3 is a process diagram for an example process associated with a defined backup in accordance with one or more embodiments described herein.

FIG. 3 is a process diagram 300 for a process using defined backup in accordance with one or more embodiments described herein. In various embodiments, the fragment component 202 can segment into a defined quantity of a plurality of fragments data that has not changed since a previous backup of a data storage device 110 and/or since an initial backup of the data storage device 110. As shown, unchanged data 302 is fragmented into unchanged data fragment 304, unchanged data fragment 306, unchanged data fragment 308, unchanged data fragment 310, and unchanged data fragment 312. It is noted that FIG. 3 is an example embodiment that shows five unchanged data fragments 304-312; any other number of fragments may be used in accordance with the present disclosure.

It is noted that unchanged data fragments herein generally do not include overlapping data (e.g., do not include redundant data); however, embodiments of the present disclosure are not so limited. In various embodiments, the backup component 204 can determine whether data is changed or unchanged by employing one or more of a variety of suitable change determination processes such as checking file modification time (e.g., checking timestamps), comparing checksums or hashes for each file (or other piece of data) as compared to a previous backup of the file (or other piece of data), utilizing a file system journal, utilizing archive bits, utilizing change block tracking, or another suitable process.

In various embodiments, the fragment component 202 can divide the unchanged data 302 into two or more unchanged data fragments. In various embodiments, according to a defined fragmenting process, the fragment component 202 can segment the unchanged data 302 alphabetically, by file size, by data modified, by structure of the corresponding data, or according to another suitable data division process. In some embodiments, according to the defined fragmenting process, the defined quantity of the plurality of fragments can be predefined or user defined. The foregoing enables flexibility and adaptability of a system to a variety of backup scenarios or requirements. In further embodiments, the fragment component 202 can determine the defined quantity of the plurality of fragments according to the defined fragmenting process based on a total size of the data and/or a type of the data storage device 110.

For example, according to the defined fragmenting process, the fragment component 202 can utilize a defined relationship between data backup size (e.g., in kilobyte(s), megabyte(s), gigabyte(s), etc.) and quantity of fragments to determine the defined quantity of the plurality of fragments in order to determine the defined quantity of the plurality of fragments.

In another example, according to the defined fragmenting process, the fragment component 202 can utilize a defined relationship between a type of data storage device 110 and quantity of fragments in order to determine the defined quantity of the plurality of fragments.

Types of a data storage device 110 may be, for example, hard disk drives, magnetic tapes, solid state drives, USB flash drives, memory cards, compact discs, digital versatile discs, Blu-ray discs, cloud storage, network attached storage, hybrid storage, or other suitable types of data storages devices. In some embodiments, the defined quantity of the plurality of fragments can be predefined or user defined. Is it noted that, in some embodiments, the data storage device 110 (containing data to be backed up) and the backup storage device 112 (which receives the backups) can include the same types of data storage devices; in other embodiments, the data storage device 110 and the backup storage device 112 can include different types of data storage devices. All suitable combinations are envisaged by the present disclosure.

In various embodiments, the backup component 204 can perform one or more defined backups (e.g., defined increment 316 backups) of the data storage device 110 to the backup storage device 112. In this regard, a defined backup as discussed herein, and thus a defined increment 316 as discussed herein, can include one of the plurality of fragments of the data (unchanged data fragment 304 in the example depicted in FIG. 3) that has not changed since the previous backup of the data storage device 110 and incremental data (e.g., changed data 314). The incremental data can include data that has changed since the previous backup of the data storage device 110. In some embodiments, the one or more defined backups can include any suitable quantity of defined backups including two or more defined backups. In this regard, the backup component 204 can perform the two or more of the defined backups iteratively a number of times equal to the defined quantity of the plurality of fragments. Therefore, a defined quantity of the plurality of fragments and the quantity of the defined backups can comprise the same quantity in order to yield a full backup and thus a full representation of the unchanged data across the defined backups. Thus, the one or more defined backups can include two, three, four, five, six, or more defined backups.

In some embodiments, fragment component 202 can determine fragments based on a calculation of one divided by the defined quantity of the plurality of fragments less a quantity of the one or more defined backups plus two from an initial backup:

$$C=(1/(n-i+2)) \quad \text{Eq. 1}$$

wherein C is a data fragment, n is the defined quantity of the plurality of fragments, and i is the quantity of the one or more defined backups from initial backup $A_1$.

This calculation excludes both changed data from between a second defined backup and a current defined backup and unchanged data from between the second defined backup and the current defined backup less one ($B_2 \ldots B_i$ and $C_2 \ldots C_{i-1}$.). A; represents all data in the system being backed up at the start of the ith backup, and $B_i$ represents incremental data between $A_{i-1}$ and $A_i$. The fragment component 202 can determine C as in Eq. 1 in response to a determination that the quantity of defined backups is less than or equal to the defined quantity of the plurality of fragments plus one:

$$i \leqq n+1 \quad \text{Eq. 2}$$

wherein i is the backup number of a given backup and n is the number of backups in a set or chain. This process is later discussed in greater detail with respect to FIGS. 4 and 5.

Additionally, or alternatively, the fragment component 202 can determine fragments based on a calculation of a combination of changed data defined by a quantity of defined backups less the defined quantity of the plurality of fragments ($B_{i-n}$) and unchanged data defined by a quantity of defined backups less the defined quantity of the plurality of fragments ($C_{i-n}$). This calculation excludes changed data from between a current defined backup and a defined backup defined by the current defined backup less the defined quantity of the plurality of fragments plus one ($B_{i-n+1} \ldots B_i$). The fragment component 202 can make this determination in response to a determination that the quantity of defined backups is greater than the defined quantity of the plurality of fragments plus one:

$$i>n+1 \quad \text{Eq. 3}$$

wherein i is the backup number of a given backup and n is the number of backups in a set or chain. This process is later discussed in greater detail with respect to FIGS. 4 and 5.

In various embodiments, elements of the one or more defined backups can include identifiers associated with respective data of the data storage device 110. Such an identifier can include, for instance, a file name represented in the data, a path name represented in the data, a block number represented in the data, or another suitable identifier. In this regard, the data overwrite component 206 can, in response to a determination that data represented by an identifier of the identifiers is overwritten, update contents of corresponding data without changing elements of a corresponding set of one or more defined backups. Stated otherwise, a chain of defined backups as discussed herein is not replaced or otherwise changed when data represented by an identifier of the identifiers is overwritten. In this regard, the identifiers can be utilized to update the data while maintaining data integrity of defined backups. For instance, the data overwrite component 206 can update a field, value, or other data element associated with an identifier without changing the identifier itself. Thus, in some embodiments, an update by the data overwrite component 206 to a data storage device 110 can result in new data. In embodiments in which the identifier is unchanged, the system 102 of FIG. 1 can determine that the data represented by the identifier has been updated or changed.

In various embodiments, performing (e.g., via system 102 as shown in FIG. 1) the one or more defined backups on the data storage device 110 can result in a dataset. Such a dataset can include, in various embodiments, a series or chain of defined backups as described herein. In this regard, elements of the dataset can include identifiers associated with respective data of the data storage device 110. In some embodiments, the data storage device 110 can include a file system. When the data storage device 110 includes a file system, an identifier of the identifiers can include a path name of a respective file of the corresponding file system. In further embodiments, the data storage device 110 can include a block storage device. When the data storage device 110 includes a block storage device, an identifier of the identifiers can include a respective block number.

In various embodiments, the recovery component 208 can, in response to a defined restoration condition being determined to be satisfied, perform a recovery of the data storage device 110. The recovery component 208 can recover full data from the backed up data, using incremented data and a set of unchanged data that consists of full data. Recovery of the data storage device 110 can include, for instance, copying by the recovery component 208 of data from the backup storage device 112 to the data storage device 110 or a replacement for the data storage device 110. In various embodiments, the foregoing can occur if recovery component 208 determines that the data storage device 110 has failed and has been replaced with suitable replacement hardware. If the data storage device 110 has not failed, recovery to the data storage device 110 can include only the failed or compromised data or can include an entire 1:1 copy of all the data from the backup storage device 112 to the data storage device 110 depending on defined recovery settings.

In some embodiments, the defined restoration condition can include user input or system 102 determination that data is to be recovered from the backup storage device 112. In various embodiments, the defined restoration condition can include a system 102 determination by the recovery component 208 that a hardware failure of the data storage device 110, a cyberattack on the data storage device 110, an accidental deletion on the data storage device 110, a natural disaster, or another suitable condition has been determined via the recovery component 208 to have occurred.

In various embodiments, the recovery via the recovery component 208 of the data storage device 110 can be based on a determination by the recovery component 208 of the defined quantity of the plurality of fragments. For instance, the recovery component 208 can determine that a backup chain on the backup storage device 112 corresponding to the data storage device 110 includes a set of five fragments and thus five increments to backup those five fragments. The recovery component 208 can thus execute the restoration from the backup storage device 112 using the set of five fragments. It is noted, however, that the use of five fragments is only used as an example, and the recovery component 208 can thus determine any other quantity of fragments or segments utilized in a backup chain herein. As previously discussed, the defined quantity of the plurality of fragments as discussed herein, and thus the length of the chain, can be predefined, user defined, or set by the fragment component 202.

Figure 4:
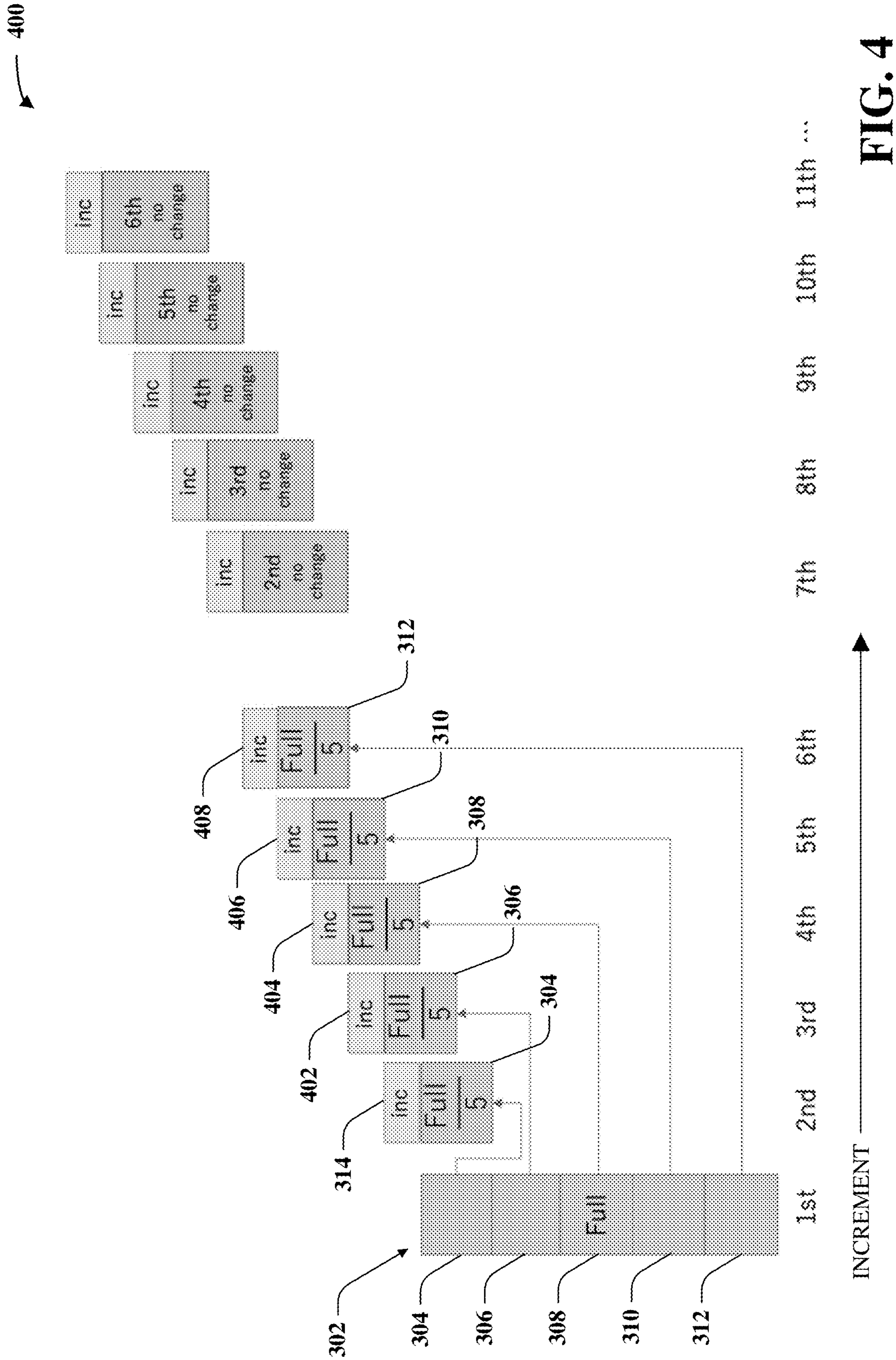
FIG. 4 illustrates example defined backup in accordance with one or more embodiments described herein.

FIG. 4 illustrates example defined backup 400 in accordance with one or more embodiments described herein. FIG. 4 shows an example in which restoration is possible from the most recent five backups. It is noted that this set of five increments is purely utilized as an example in FIG. 4, and any suitable quantity of increments can be utilized in various embodiments herein. In FIG. 4, the first backup is a backup of unchanged data 302. The first backup is a full backup. The next five backups (as shown, increments two through six) are utilized by a system (e.g., system 102 of FIG. 1) to backup data that has changed since the previous backup as well as one-fifth of the data that has not changed since the first full backup. Data that has changed since the previous backup may be referred to as incremental data; incremental data may include, for example, data that has been overwritten, added, and/or deleted. Data that has not changed since the first full backup may be referred to as unchanged data, such as unchanged data 302. In the example in FIG. 4, the system 102 of FIG. 1 saves one-fifth of the data that has not changed since the first full backup as part of each increment so that a full copy of the data is captured over the course of the five incremental backups. Thus, the five incremental backups can be used to restore the full set of data.

For example, the second backup (e.g., a first increment) can include unchanged data fragment 304 and changed data 314, the third backup (e.g., a second increment) can include unchanged data fragment 306 and changed data 402, the fourth backup (e.g., a third increment) can include unchanged data fragment 308 and changed data 404, the fifth backup (e.g., a fourth increment) can include unchanged data fragment 310 and changed data 406, and the sixth backup (e.g., a fifth increment) can include unchanged data fragment 312 and changed data 408. In the seventh and subsequent backups, in addition to the incremental data, data that has not changed through the sixth backup (fifth increment) from data that has already been backed up in the five prior backups (the second through sixth backups) is backed up from the data storage device 110 to the backup storage device 112. The incremental data is shown as inc in FIG. 4.

Figure 5:
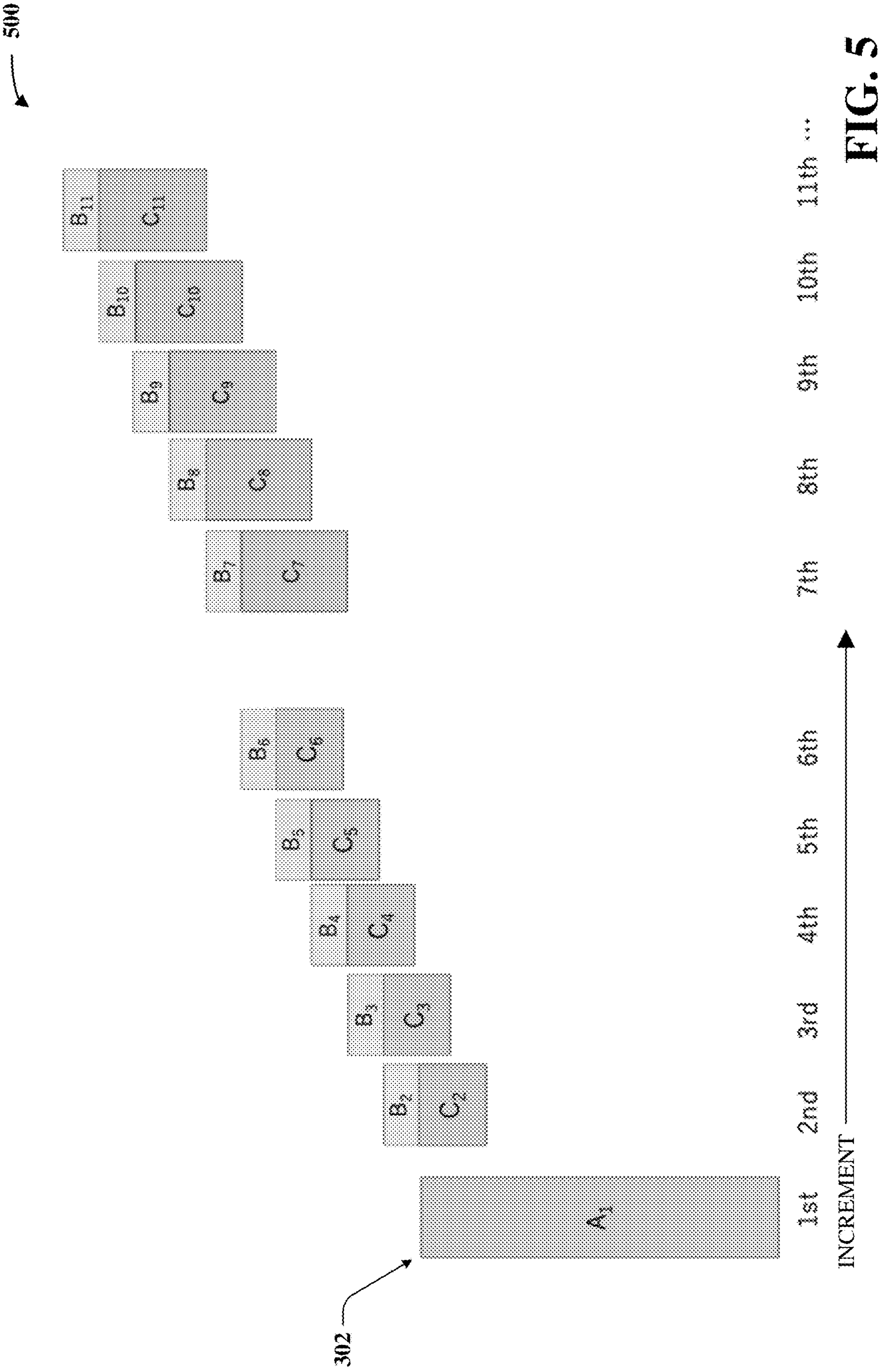
FIG. 5 illustrates example defined backup in accordance with one or more embodiments described herein.

FIG. 5 illustrates example defined backup 500 in accordance with one or more embodiments of the present disclosure. Specifically, FIG. 5 shows data that is backed up at each increment in accordance with various embodiments of the present disclosure. Incremental backups can be repeated, for instance, so that restoration is possible from the most recent n backups. FIG. 5 illustrates an example where the system data is fully backed up each time when n=5. It is noted use of n=5 increments is purely used as an example; any suitable value for n can be utilized in various embodiments of the present disclosure. The data sets used in each backup increment (and the initial full backup) in FIG. 5 are as follows.

$A_i$ represents all data in the system being backed up at the start of the ith backup.

$B_i$ represents incremental data between $A_{i-1}$ and $A_i$.

C represents a data fragment.

If the quantity of defined backups is less than or equal to the defined quantity of the plurality of fragments plus one ($1 \leq n+1$), $C_i$ represents data corresponding to the amount of $1/(n-i+2)$ from $A_1$ excluding the portions contained in $B_2 \ldots B_i$ and $C_2 \ldots C_{i-1}$. The foregoing represents a calculation of one divided by the defined quantity of the plurality of fragments less a quantity of the one or more defined backups plus two from an initial backup. Here, C is a data fragment, n is the defined quantity of the plurality of fragments, and i is the quantity of the one or more defined backups from initial backup $A_1$. This calculation excludes both changed data from between a second defined backup and a current defined backup and unchanged data from between the second defined backup and the current defined backup less one. Here, i is the backup number of a given backup and n is the number of backups in a set or chain.

If the quantity of defined backups is greater than the defined quantity of the plurality of fragments plus one ($i>n+1$), $C_i$ represents data excluding the portions contained in $B_{i-n+1} \ldots B_i$ from the union of $B_{i-n}$ and $C_{i-n}$. The foregoing represents a calculation of a combination of changed data defined by a quantity of defined backups less the defined quantity of the plurality of fragments ($B_{i-n}$) and unchanged data defined by a quantity of defined backups less the defined quantity of the plurality of fragments ($C_{i-n}$). This calculation excludes changed data from between a current defined backup and a defined backup defined by the current defined backup less the defined quantity of the plurality of fragments plus one ($B_{i-n+1} \ldots B_i$).

It is noted that the elements of each set can include identifiers (e.g., $A_1$, $B_2$, $C_2$, $B_3$, $C_3$, $B_4$, $C_4$, etc.) associated with respective data; these identifiers are not the contents of the data. When the data of a certain identifier is overwritten, the contents of the data change but the elements of the set do not change. The type identifier depends on the system being backed up. For example, when a file system is to be backed up by a system (e.g., system 102 as shown in FIG. 1), the path name of the file can be the identifier; when a block device is to be backed up by a system, the block number can be the identifier.

After the full backup (e.g., $A_1$), the data backed up via the second backup and subsequent backups include ($B_i \cup C_i$). In the backup target, the more data that is overwritten, the less $C_i$ there is; the more data that is added, the more $C_i$ there is. The behavior of each backup is shown below in the example of n=5:

First backup (i = 1)
$A_1$ = {All data in the system to be backed up at the time the first backup begins}
$B_1$ = { }
$C_1$ = { }

When the first backup is completed, it is possible to recover data from the first backup to the state the data was in when the first backup started.

Second backup (i = 2)
$A_2$ = {All data in the system being backed up at the start of the second backup}
$B_2$ = {The incremental data between $A_1$ and $A_2$.}
$C_2$ = {Data equivalent to one-fifth of the data remaining after subtracting the amount included in $B_2$ from the amount included in $A_1$}

When the second backup is complete, B2 contains any data that has been changed since the first backup. Therefore, it is possible to recover data from the first and second backups to the data at the start of the second backup.

Third backup (i = 3)
$A_3$ = {All data in the system being backed up at the start of the third backup}
$B_3$ = {The incremental data between $A_2$ and $A_3$}
$C_3$ = {Data equivalent to one-fourth of the data remaining after subtracting the amount included in ($B_2 \cup B_3 \cup C_2$) from the amount included in $A_1$}

When the third backup is complete, the data that has been changed since the first backup is included in ($B2 \cup B3$). Therefore, it is possible to recover data from the first to third backups to the data at the start of the third backup.

Fourth backup (i = 4)
$A_4$ = {All data in the system being backed up at the start of the 4th backup}
$B_4$ = {The incremental data between $A_3$ and $A_4$}
$C_4$ = {Data equivalent to one-third of the data remaining after subtracting the amount included in ($B_2 \cup B_3 \cup B_4 \cup C_2 \cup C_3$) from the amount included in $A_1$}

When the fourth backup is complete, the data that has been changed since the first backup is included in ($B2 \cup B3 \cup B4$). Therefore, it is possible to recover data from the first to fourth backups to the data at the start of the fourth backup.

Fifth backup (i = 5)
$A_5$ = {All data in the system being backed up at the start of the 5th backup}
$B_5$ = {The incremental data between $A_4$ and $A_5$}
$C_5$ = {Data equivalent to half of the data remaining after subtracting the amount included in ($B_2 \cup B_3 \cup B_4 \cup B_5 \cup C_2 \cup C_3 \cup C_4$) from the amount included in $A_1$}

When the fifth backup is complete, the data that has been changed since the first backup is included in ($B2 \cup B3 \cup B4 \cup B5$). Therefore, it is possible to recover data from the first to fifth backups to the data at the start of the fifth backup.

Sixth backup (i = 6)
$A_6$ = {All data in the system being backed up at the start of the 6th backup}
$B_6$ = {The incremental data between $A_5$ and $A_6$}
$C_6$ = {Data subtracting the amount included in ($B_2 \cup B_3 \cup B_4 \cup B_5 \cup B_6 \cup C_2 \cup C_3 \cup C_4 \cup C_5$) from the amount included in $A_1$}

When the sixth backup is complete, the data that has not been changed since the first backup is included in ($C2 \cup C3 \cup C4 \cup C5 \cup C6$), and data that has changed since the first backup is included in ($B2 \cup B3 \cup B4 \cup B5 \cup B6$). Therefore, even if the first backup is not available, it is possible to recover data from the second to sixth backups to the data at the start of the sixth backup.

Seventh backup (i = 7)
$A_7$ = {All data in the system being backed up at the start of the 7th backup}
$B_7$ = {The incremental data between $A_6$ and $A_7$}
$C_7$ = {Data subtracting the amount included in ($B_3 \cup B_4 \cup B_5 \cup B_6 \cup B_7$) from the amount included in ($B_2 \cup C_2$) }

When the seventh backup is completed, the data that has not been changed since the first backup is included in ($C3 \cup C4 \cup C5 \cup C6 \cup C7$), and data that has changed since the first backup is included in ($B3 \cup B4 \cup B5 \cup B6 \cup B7$). Therefore, even if the first and second backups are not available, it is possible to recover data from the third to seventh backups to the data at the start of the seventh backup.

Eighth backup (i = 8)
$A_8$ = {All data in the system being backed up at the start of the 8th backup}
$B_8$ = {The incremental data between $A_7$ and $A_8$}
$C_8$ = {Data subtracting the amount included in ($B_4 \cup B_5 \cup B_6 \cup B_7 \cup B_8$) from the amount included in ($B_3 \cup C_3$)}

At the time the eighth backup is completed, the data that has not been changed since the 1st backup is included in ($C_4 \cup C_5 \cup C_6 \cup C_7 \cup C_8$), and data that has changed since the first backup is included in ($B_4 \cup B_5 \cup B_6 \cup B_7 \cup B_8$). Therefore, even if the first to third backups are not available, it is possible to recover data from the fourth to eighth backups to the data at the start of the eighth backup.

Figure 6:
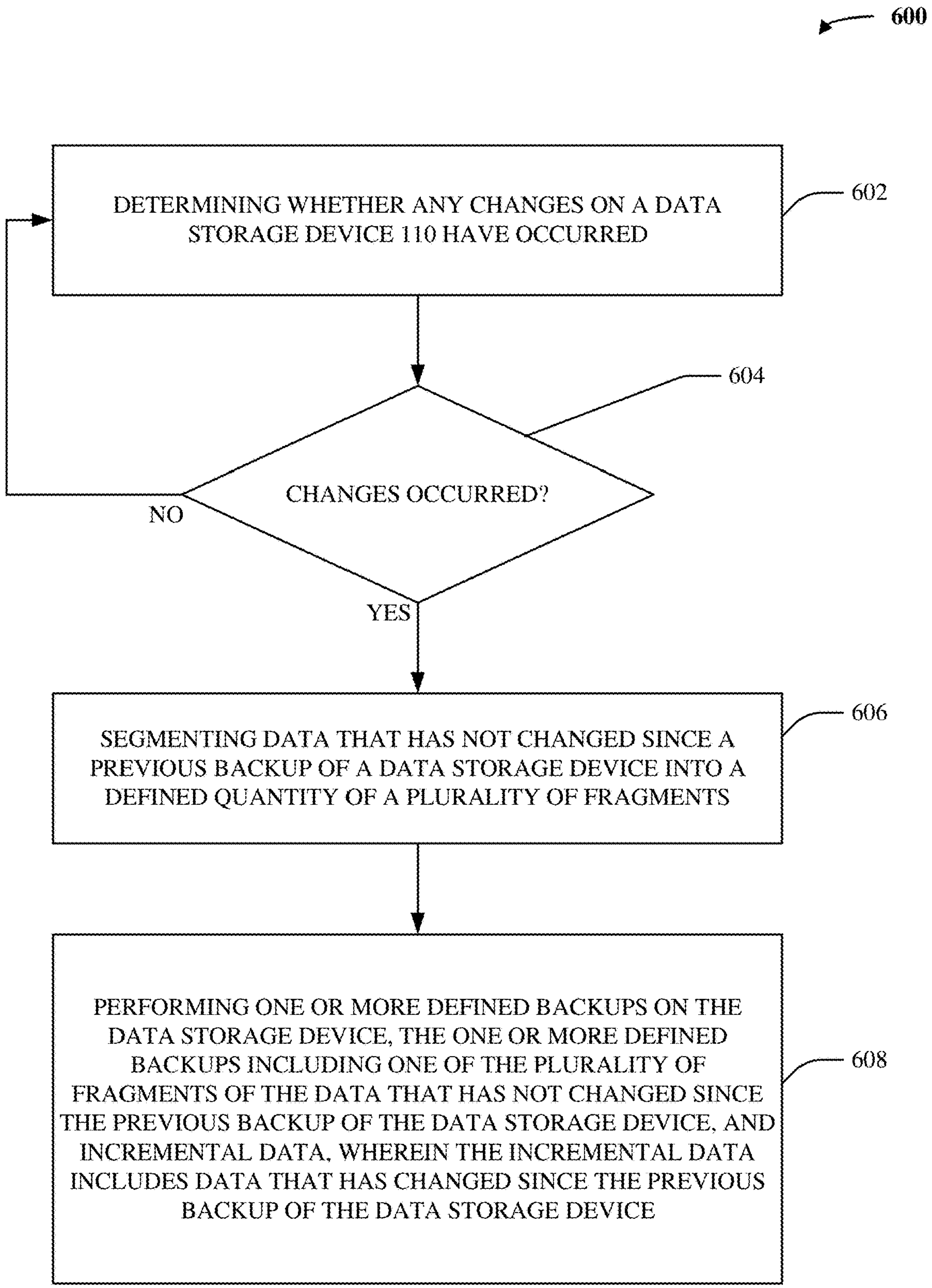
FIG. 6 is a flow diagram for a process associated with a defined backup in accordance with one or more embodiments described herein.

FIG. 6 is a flow diagram for a defined backup process 600 in accordance with one or more embodiments of the present disclosure. At 602, the process 600 includes determining whether any changes on a data storage device have occurred. In some embodiments, a backup component (e.g., backup component 204 as shown in FIG. 2) may determine whether any changes have occurred on the data storage device (e.g., data storage device 110 as shown in FIG. 1).

At 604, if any changes on a data storage device have occurred (YES at 604), the process can proceed to 606. If at 604, no changes on a data storage device have occurred (NO at 604), the process can return to 602.

At 606, the process 600 includes segmenting data that has not changed since a previous backup of a data storage device into a defined quantity of a plurality of fragments. In some embodiments, a fragment component (e.g., fragment component 202 as shown in FIG. 2) can segment unchanged data 302 into unchanged data fragment 304, unchanged data fragment 306, unchanged data fragment 308, unchanged data fragment 310, and/or unchanged data fragment 312 as shown in FIG. 3.

At 608, the process 600 includes performing one or more defined backups on the data storage device, the one or more defined backups including: one of the plurality of fragments of the data that has not changed since the previous backup of the data storage device, and incremental data, wherein the incremental data includes data that has changed since the previous backup of the data storage device. In some embodiments, a backup component (e.g., backup component 204 as shown in FIG. 2) can perform one or more defined increment 316 backups on a data storage device (e.g., data storage device 110 as shown in FIG. 1), the one or more defined increment 316 backups including: one of the unchanged data fragments 304, 306, 308, 310, or 312 that has not changed since the previous backup of the data storage device, and changed data 314, wherein the changed data 314 includes data that has changed since the previous backup of the data storage device.

Figure 7:
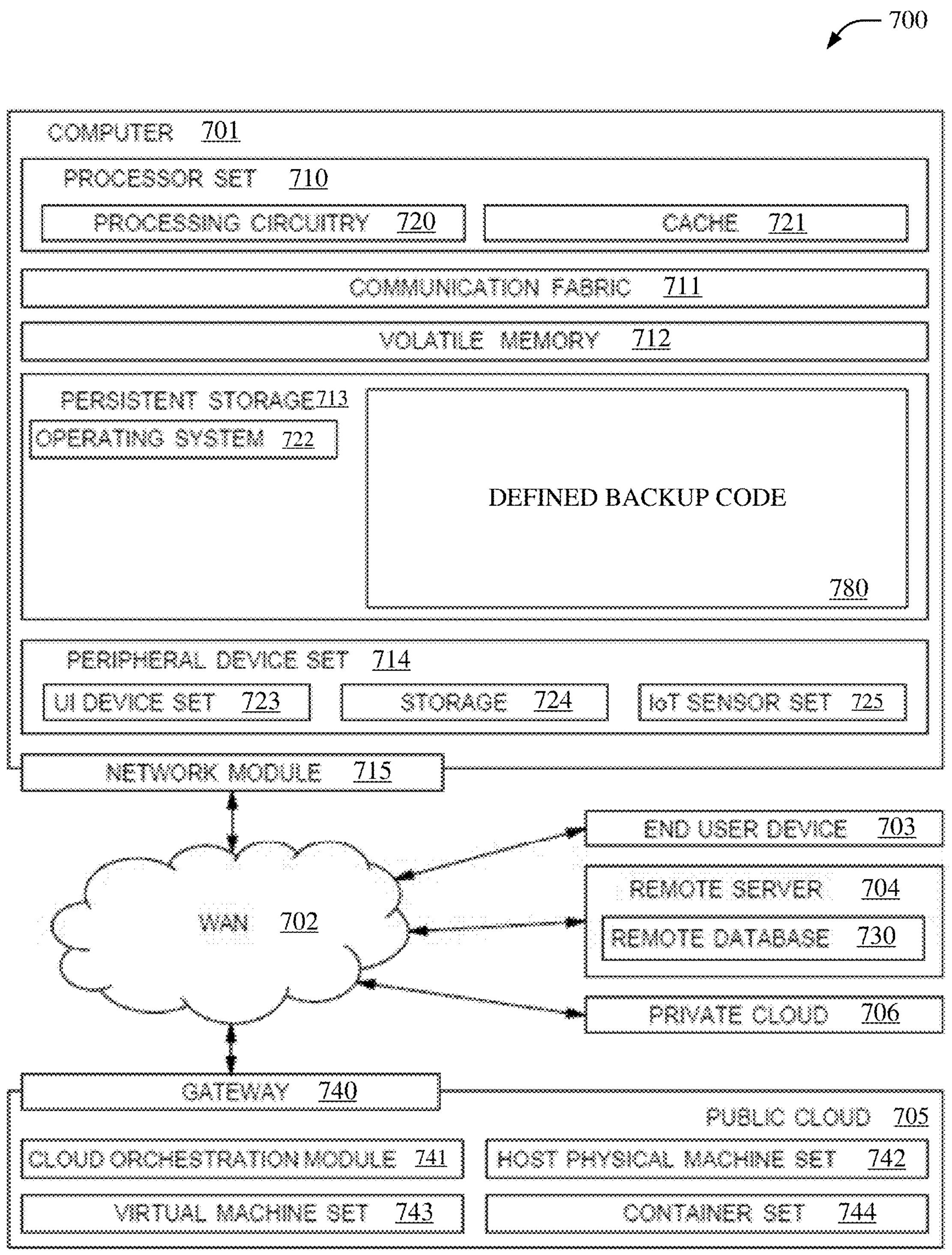
FIG. 7 illustrates a block diagram of an example operating environment in which one or more embodiments described herein can be facilitated.

FIG. 7 and the following discussion are intended to provide a brief, general description of a suitable computing environment 700 in which one or more embodiments described herein can be implemented. For example, various aspects of the present disclosure are described by narrative text, flowcharts, block diagrams of computer systems or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se such as radio waves or other freely propagating electromagnetic waves, electromagnetic waves propagating through a waveguide, light pulses passing through a fiber optic cable, electrical signals communicated through a wire, or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 700 contains an example of an environment for the execution of at least some of the computer code involved in performing the inventive methods, such as defined backup code 780. In addition to defined backup code 780, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and defined backup code 780, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method can be distributed among multiple computers or between multiple locations. On the other hand, in this presentation of computing environment 700, detailed discussion is focused on a single computer, specifically computer 701, to keep the presentation as simple as possible. Computer 701 can be located in a cloud, even though it is not shown in a cloud in FIG. 7. On the other hand, computer 701 is not required to be in a cloud except to any extent as can be affirmatively indicated.

Processor set 710 includes one, or more, computer processors of any type now known or to be developed in the future. Processing circuitry 720 can be distributed over multiple packages, for example, multiple, coordinated integrated circuit chips. Processing circuitry 720 can implement multiple processor threads or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set can be located "off chip." In some computing environments, processor set 710 can be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods can be stored in defined backup code 780 in persistent storage 713.

Communication fabric 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths can be used, such as fiber optic communication paths or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory can be distributed over multiple packages or located externally with respect to computer 701.

Persistent storage 713 is any form of non-volatile storage for computers that is now known or to be developed in the future. The non-volatility of this storage means that the stored data is maintained regardless of whether power is being supplied to computer 701 or directly to persistent storage 713. Persistent storage 713 can be a read only memory (ROM), but typically at least a portion of the persistent storage allows writing of data, deletion of data and re-writing of data. Some familiar forms of persistent storage include magnetic disks and solid-state storage devices. Operating system 722 can take several forms, such as various known proprietary operating systems or open-source Portable Operating System Interface type operating systems that employ a kernel. The code included in defined backup code 780 typically includes at least some of the computer code involved in performing the inventive methods.

Peripheral device set 714 includes the set of peripheral devices of computer 701. Data communication connections between the peripheral devices and the other components of computer 701 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 can include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 can be persistent or volatile. In some embodiments, storage 724 can take the form of a quantum computing storage device for storing data in the form of qubits. In embodiments where computer 701 is required to have a large amount of storage (for example, where computer 701 locally stores and manages a large database) then this storage can be provided by peripheral storage devices designed for storing large amounts of data, such as a storage area network (SAN) that is shared by multiple, geographically distributed computers. IoT sensor set 725 is made up of sensors that can be used in Internet of Things applications. For example, one sensor can be a thermometer, and another sensor can be a motion detector.

Network module 715 is the collection of computer software, hardware, and firmware that allows computer 701 to communicate with other computers through WAN 702. Network module 715 can include hardware, such as modems or Wi-Fi signal transceivers, software for packetizing or de-packetizing data for communication network transmission, or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN can be replaced or supplemented by local area networks (LANs) designed to communicate data between devices located in a local area, such as a Wi-Fi network. The WAN or LANs typically include computer hardware such as copper transmission cables, optical transmission fibers, wireless transmission, routers, firewalls, switches, gateway computers and edge servers.

EUD 703 is any computer system that is used and controlled by an end user (for example, a customer of an enterprise that operates computer 701) and can take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 can be a client device, such as thin client, heavy client, mainframe computer or desktop computer.

Remote server 704 is any computer system that serves at least some data or functionality to computer 701. Remote server 704 can be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data can be provided to computer 701 from remote database 730 of remote server 704.

Public cloud 705 is any computer system available for use by multiple entities that provides on-demand availability of computer system resources or other computer capabilities, especially data storage (cloud storage) and computing power, without direct active management by the scale. The direct and active management of the computing resources of public cloud 705 is performed by the computer hardware or software of cloud orchestration module 741. The computing resources provided by public cloud 705 are typically implemented by virtual computing environments that run on various computers making up the computers of host physical machine set 742, which is the universe of physical computers in or available to public cloud 705. The virtual computing environments (VCEs) typically take the form of virtual machines from virtual machine set 743 or containers from container set 744. It is understood that these VCEs can be stored as images and can be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware and firmware allowing public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, or data/application portability between the multiple constituent clouds. In this embodiment, public cloud 705 and private cloud 706 are both part of a larger hybrid cloud.

Aspects of the one or more embodiments described herein are described with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general-purpose computer, special purpose computer or other programmable data processing apparatus to produce a machine, such that the instructions, which execute via the processor of the computer or other programmable data processing apparatus, can create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein can comprise an article of manufacture including instructions which can implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, or operation of possible implementations of systems, computer-implementable methods, or computer program products according to one or more embodiments described herein. In this regard, each block in the flowchart or block diagrams can represent a module, segment, or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams or flowchart illustration, or combinations of blocks in the block diagrams or flowchart illustration, can be implemented by special purpose hardware-based systems that can perform the specified functions or acts or carry out one or more combinations of special purpose hardware or computer instructions.

As used in this application, the terms "component," "system," "platform" or "interface" can refer to or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter described herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The disclosure herein describes non-limiting examples of various embodiments. For ease of description or explanation, various portions of the herein disclosure utilize the term "each," "every," or "all" when discussing various embodiments. Such usages of the term "each," "every," or "all" are non-limiting examples. In other words, when the herein disclosure provides a description that is applied to "each," "every," or "all" of some particular object or component, it should be understood that this is a non-limiting example of various embodiments, and it should be further understood that, in various other embodiments, it can be the case that such description applies to fewer than "each," "every," or "all" of that particular object or component.

What has been described above includes mere examples of systems and computer-implemented methods. It is, of course, not possible to describe every conceivable combination of components or computer-implemented methods for purposes of describing the one or more embodiments, but one of ordinary skill in the art can recognize that many further combinations or permutations of the one or more embodiments are possible. Furthermore, to the extent that the terms "includes," "has," "possesses," and the like are used in the detailed description, claims, appendices, or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:

a processor that executes computer executable components stored in a computer-readable memory, wherein the computer executable components comprise:

a fragment component that segments data that has not changed since a previous backup of a data storage device into a defined quantity of a plurality of fragments; and a backup component that performs one or more defined backups on the data storage device, the one or more defined backups comprising:

one of the plurality of fragments of the data that has not changed since the previous backup of the data storage device; and incremental data, wherein the incremental data comprises data that has changed since the previous backup of the data storage device, wherein elements of the one or more defined backups comprise identifiers associated with respective data of the data storage device; and a data overwrite component that updates contents of corresponding data without changing elements of a corresponding set of one or more defined backups in response to a determination that data represented by an identifier of the identifiers is overwritten.

2. The system of claim 1, wherein the one or more defined backups comprises two or more defined backups, and wherein the backup component performs the two or more defined backups iteratively a number of times equal to the defined quantity of the plurality of fragments.

3. The system of claim 1, wherein the fragment component further:

determines the defined quantity of the plurality of fragments according to a defined fragmenting process based on a total size of data or a type of the data storage device.

4. The system of claim 3, wherein the one of the plurality of fragments is determined based on a calculation of one divided by the defined quantity of the plurality of fragments less a quantity of the one or more defined backups plus two from an initial backup, wherein the calculation excludes changed data from between a second defined backup and a current defined backup, wherein the calculation excludes unchanged data from between the second defined backup and the current defined backup less one, and wherein the one of the plurality of fragments is determined in response to a determination that a quantity of defined backups is less than or equal to the defined quantity of the plurality of fragments plus one.

5. The system of claim 3, wherein the one of the plurality of fragments is determined based on a calculation of a combination of changed data defined by a quantity of defined backups less the defined quantity of the plurality of fragments and unchanged data defined by a quantity of defined backups less the defined quantity of the plurality of fragments, wherein the calculation excludes changed data from between a current defined backup and a defined backup defined by the current defined backup less the defined quantity of the plurality of fragments plus one, and wherein the one of the plurality of fragments is determined in response to a determination that a quantity of defined backups is greater than the defined quantity of the plurality of fragments plus one.

6. The system of claim 1, wherein the performing of the one or more defined backups on the data storage device results in a dataset.

7. The system of claim 6, wherein elements of the dataset comprise identifiers associated with respective data of the data storage device.

8. The system of claim 7, wherein the data storage device comprises a file system, and wherein an identifier of the identifiers comprises a path name of a respective file of the file system.

9. The system of claim 7, wherein the data storage device comprises a block storage device, and wherein an identifier of the identifiers comprises a respective block number.

10. The system of claim 1, wherein the computer executable components further comprise:

a recovery component that performs a recovery of the data storage device in response to a defined restoration condition being determined to be satisfied, wherein the recovery of the data storage device is based on a determination of the defined quantity of the plurality of fragments.

11. A non-transitory machine-readable medium comprising executable instructions that, when executed by at least one processor, facilitate performance of operations comprising:

segmenting data that has not changed since a previous backup of a data storage device into a defined quantity of a plurality of fragments; and performing one or more defined backups on the data storage device, the one or more defined backups comprising:

one of the plurality of fragments of the data that has not changed since the previous backup of the data storage device; and incremental data, wherein the incremental data comprises data that has changed since the previous backup of the data storage device, wherein elements of the one or more defined backups comprise identifiers associated with respective data of the data storage device; and updating contents of corresponding data without changing elements of a corresponding set of one or more defined backups in response to a determination that data represented by an identifier of the identifiers is overwritten.

12. The machine-readable medium of claim 11, wherein the one or more defined backups comprises two or more defined backups, and wherein the operations further comprise:

performing the two or more defined backups iteratively a number of times equal to the defined quantity of the plurality of fragments.

13. The machine-readable medium of claim 11, wherein the operations further comprise:

determining the defined quantity of the plurality of fragments according to a defined fragmenting process based on a total size of data or a type of the data storage device.

14. The machine-readable medium of claim 13, wherein the one of the plurality of fragments is determined based on a calculation of one divided by the defined quantity of the plurality of fragments less a quantity of the one or more defined backups plus two from an initial backup, wherein the calculation excludes changed data from between a second defined backup and a current defined backup, wherein the calculation excludes unchanged data from between the second defined backup and the current defined backup less one, and wherein the one of the plurality of fragments is determined in response to a determination that a quantity of defined backups is less than or equal to the defined quantity of the plurality of fragments plus one.

15. The machine-readable medium of claim 13, wherein the one of the plurality of fragments is determined based on a calculation of a combination of changed data defined by a quantity of defined backups less the defined quantity of the plurality of fragments and unchanged data defined by a quantity of defined backups less the defined quantity of the plurality of fragments, wherein the calculation excludes changed data from between a current defined backup and a defined backup defined by the current defined backup less the defined quantity of the plurality of fragments plus one, and wherein the one of the plurality of fragments is determined in response to a determination that a quantity of defined backups is greater than the defined quantity of the plurality of fragments plus one.

16. A method, comprising:

segmenting, by a system operatively coupled to a processor, data that has not changed since a previous backup of a data storage device into a defined quantity of a plurality of fragments; and performing, by the system, one or more defined backups on the data storage device, the one or more defined backups comprising:

one of the plurality of fragments of the data that has not changed since the previous backup of the data storage device; and incremental data, wherein the incremental data comprises data that has changed since the previous backup of the data storage device, wherein elements of the one or more defined backups comprise identifiers associated with respective data of the data storage device; and updating contents of corresponding data without changing elements of a corresponding set of one or more defined backups in response to a determination that data represented by an identifier of the identifiers is overwritten.

* * * * *